Jan. 5, 1937.  A. P. FERGUESON  2,067,008
WHEEL AND VALVE STEM ASSEMBLY
Filed Aug. 9, 1934  2 Sheets-Sheet 1
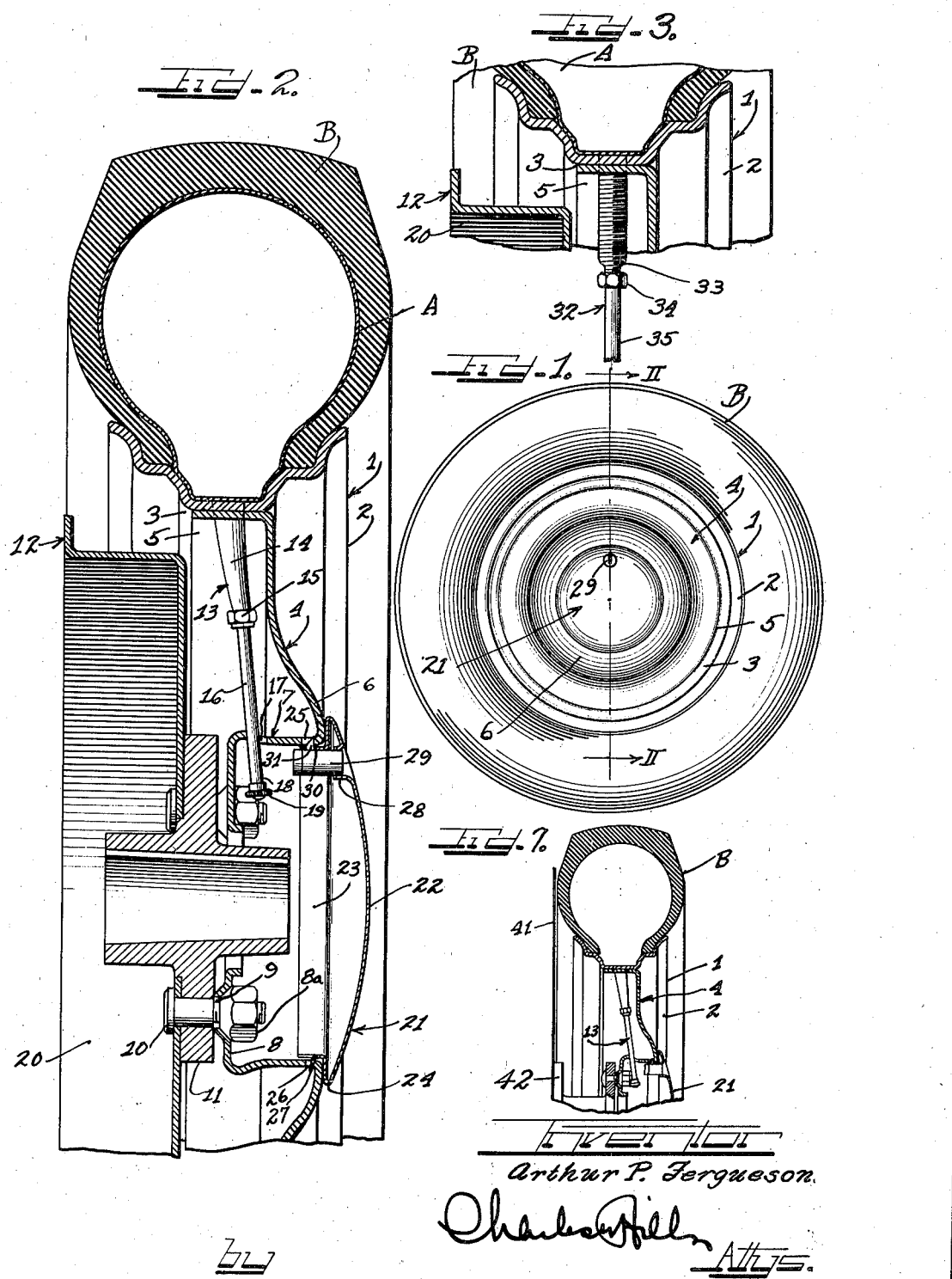
Inventor
Arthur P. Fergueson

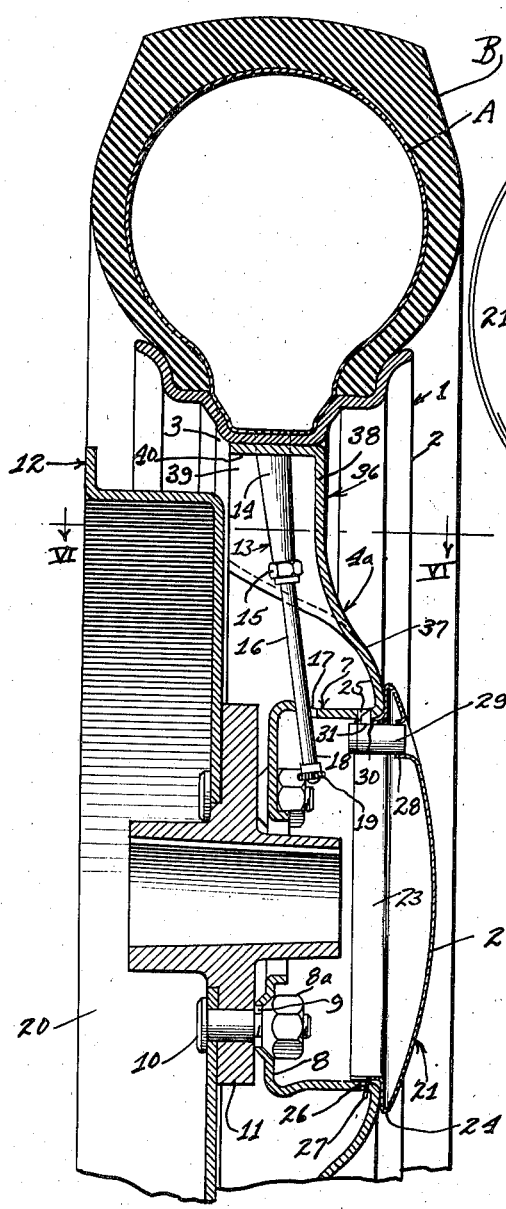

Patented Jan. 5, 1937

2,067,008

UNITED STATES PATENT OFFICE 2,067,008

WHEEL AND VALVE STEM ASSEMBLY

Arthur P. Fergueson, Detroit, Mich., assignor to Lyon Cover Company, Detroit, Mich., a corporation of Michigan Application August 9, 1934, Serial No. 739,070

4 Claims. (Cl. 152—12)

This invention has to do with automobile wheels and is concerned more particularly with a combination wheel, brake drum and tire valve assembly for preventing theft of the tire from a running wheel, that is, a wheel which is supporting the vehicle.

It is not uncommon practice for thieves to jack up a car so as to free the tires from the ground and tamper with the tire valves so as to relieve the tires of pressure sufficiently to render the tires readily removable from the wheels.

It is accordingly an object of the invention to provide an improved wheel structure combined with a tire valve in such a manner as to discourage tampering with the valve and thus serve as a means for prevention of theft of running tires.

It is another object of the invention to provide a means for locking a running wheel on an axle or other support therefor.

It is a further object of the invention to lock a running wheel on an axle or other support therefor and at the same time prevent unauthorized access to the valve of the tire carried by the wheel.

A further object of the invention involves the provision of an improved disc wheel formed to assist in the prevention of unauthorized access to the valve of the running tire.

It is a still further object of the invention to provide an improved spoke wheel structure arranged to cooperate with the tire valve so as to prevent unauthorized access thereto.

In accordance with the general features of the invention, one embodiment involves the provision of a disc wheel closed at the front and having a rearwardly extending hollow hub arranged to be bolted or otherwise suitably secured to the hub of the wheel brake drum. The wheel is formed so that the forward portion thereof cooperates with the drum in substantially entirely closing the tire valve, the wheel hub being provided with an opening through which the valve stem extends into the interior of the hub. A locking device applied to the front of the disc hub prevents access to the inner end of the valve, and the brake drum at the rear of the wheel cooperates with the wheel in also preventing access to the part of the valve extending inwardly from the rim of the wheel.

Another embodiment of the invention involves the provision of a wheel having spokes formed so that one of them provides a housing closed from the front and sides, the spokes being joined inwardly and providing a rearwardly extending hollow hub provided with locking means and arranged to cooperate with the valve stem and wheel support and brake drum in the manner hereinabove described.

When a wheel and valve stem assembly embodying the invention is mounted on a support in vehicle supporting position or on a spare wheel carrier, the support and associated part of the vehicle cooperate with the tire to render the valve substantially inaccessible from the rear side of the wheel, and the lock for the hub of the wheel prevents access to the valve stem from the front of the wheel. The lock is preferably made so as to be readily releasable by use of the proper key or the like to render the inner end of the valve stem accessible and also to render the wheel mounting means accessible when it is desired to mount or remove the wheel.

Other objects and advantages of the invention will appear as the description proceeds.

This invention (in preferred forms) is illustrated in the drawings and hereinafter more fully described.

On the drawings:

Figure 1 is an elevational view of a wheel and hub lock structure embodying one form of the invention, with a tire mounted thereon.

Figure 2 is an enlarged fragmentary sectional view taken substantially in the plane designated by the line II—II in Figure 1, looking in the direction of the arrows.

Figure 3 is a fragmentary sectional view of a modified form of tire valve stem employed in conjunction with the remainder of the structure appearing in Figures 1 and 2.

Figure 4 is a view similar to Figure 1 but of a modified wheel construction.

Figure 5 is an enlarged fragmentary sectional view taken substantially in the plane designated by the line V—V in Figure 4 looking in the direction of the arrows.

Figure 6 is a fragmentary sectional view taken substantially in the plane designated by the line VI—VI in Figure 5, looking in the direction of the arrows.

Figure 7 is a reduced fragmentary sectional view of a modified form of the invention.

Referring now more particularly to the drawings, one form of the invention is shown in Figures 1 and 2 and includes a wheel 1 which may have any suitable rim formation, the rim 2 illustrated being of the drop center type as shown at 3. The wheel 1 is of the disc type and accordingly includes a disc portion 4 provided with a peripheral rearwardly extending flange 5 fitting in and of substantially the same width as the drop center 3. The flange 5 is preferably welded to the center 3, but if desired it may be riveted or otherwise suitably secured thereto. The disc portion 4, inwardly of its flange 5, is bulged forwardly at 6 in substantially spaced relation to the axis of the wheel, and is thereupon formed into a rearwardly extending substantially cylindrical hub 7. The hub 7 terminates rearwardly in an inwardly extending attaching flange 8 lying in substantially the median plane of the wheel. The attaching flange 8 is provided with a circular series of bolt openings 9 through which the threaded ends of attaching bolts 10 are adapted to extend. Nuts 8a applied to the threaded ends of the bolts 10 and engaging in counter-sunk portions adjacent the openings 9 serve to firmly attach the wheel in place on the hub 11 of a brake drum 12, the hub 11 being formed to be mounted for rotation with an axle or other wheel supporting rotary member.

The flange 5 of the disc portion 4 is formed with an opening registering with a corresponding opening in the drop center 3 of the rim 2, and through these openings the valve stem 13 of the inner tube A of a tire B mounted on the wheel 1 extends. The portion 14 of the stem extending through the drop center 3 and flange 5 may be made of rubber or other readily flexible material, connected by any suitable coupling means 15 to a valve stem extension 16. The extension 16 may be flexible or may be made of rigid material such as metal or the like. The wheel hub 7 is provided adjacent its attaching flange 8 with an opening 17 through which the extension 16 is adapted to extend so as to locate the inner end 18 of the extension within the interior of the hub 7. A cap 19 may be mounted on said inner end 18 if desired.

The brake drum 12 is disposed in such cooperative relation to the drop center 3 and disc flange 5, and the coupling 15 is disposed radially inward of the brake surface portion 20 of the drum 12 so as to be substantially inaccessible from the rear of the wheel. In some brake and wheel designs, the brake surface portion may be disposed in substantially contiguous relation to the flange 5 and/or drop center 3 so as to positively prevent access to any part of the valve stem. In other installations, there may be a slight space as illustrated, the drum 12 extending outwardly to a sufficient extent, however, to render the coupling 15 substantially inaccessible from the rear side of the wheel.

A hub cap 21 for closing the front of the hub 7 is provided with a forwardly bulged face 22 for ornamental purposes as well as to resist denting and is provided rearwardly with a skirt 23 of reduced diameter and formed to telescope into the hub 7. The portion of the cap 21 extending radially beyond the skirt 23 provides a flange 24 which is engageable with the inner peripheral portion of the bulged part 6. The hub 7 adjacent the bulged part 6 is provided with preferably diametrically opposed openings 25 and 26. A tongue 27 is cut from the skirt 23 so as to project laterally outwardly and form with the hub cap flange 24 a hook, said tongue being adapted to be hooked into the opening 26. Opposite the tongue 27, the cap 21 is formed with an opening surrounded by a rearwardly disposed flange 28 in which a lock cylinder 29 is welded, brazed or otherwise suitably rigidly mounted. The lock cylinder 29 is preferably arranged so as to be disposed at the inner periphery of the skirt 23, that portion of the skirt being provided with an opening 30 arranged to register with the opening 25 in the hub 7 when the tongue 27 is hooked in the opening 26 and the cap 21 is swung so as to bring its flange 24 in engagement with the disc 4. The lock cylinder 29 is provided with a key-controlled plunger or keeper 31 which projects through the skirt opening 30 and is preferably spring pressed and beveled rearwardly so as to be cammed inwardly as the cap is swung into closed position with respect to the disc 4 and to thereafter snap outwardly into the opening 25 in the hub 7. When positioned in the hub opening 25, the plunger or keeper 31 positively locks the cap 21 in hub closing position, thereby preventing access to the inner end 18 of the valve stem extension 16. When the cap 21 is locked in place as illustrated, it also prevents unauthorized access to the attaching nuts 8a, thus preventing unauthorized removal of the wheel from the support therefor.

In the form of the invention shown in Figure 3, a modified form of valve stem 32 is used. This stem comprises a stem portion 33 of rigid material such as metal extending through the drop center 3 and disc flange 5, and coupled by a nut or nipple 34 or other suitable means to a preferably flexible valve stem extension 35 which preferably cooperates with the hub 7 in the same manner in which the extension 16 of the previously described form of the invention cooperates with the hub.

In the form of the invention appearing in Figures 4, 5, and 6, a preferably steel spoke wheel is employed instead of the disc wheel of Figures 1, 2, and 3. For convenience, all parts appearing in the form of Figures 4, 5, and 6 which are identical with those shown in Figures 1 and 2 are like numbered.

The spoke wheel disc 4a is so formed that the spokes 36 are united adjacent the hub 7 to provide an annular portion 37 which may be of the same general shape as the bulged portion 6 of the disc 4. Each spoke 36 is of generally U shape in cross section as more clearly shown in Figure 6, with its bight 38 at the front and its sides 39 extending rearwardly so as to terminate in a plane preferably at the rear edge of the drop center 3. Each spoke 36 is thus of a generally channel form and is closed at 40 at its outer end. The end walls 40 are welded, riveted or otherwise suitably secured to the drop center 3, and one of said walls is provided with an opening registering with an opening in the drop center 3 so as to receive the tire valve stem 13 or 32 (Figure 3), as desired.

The spokes 36 terminate rearwardly in a plane adjacent that of the forward wall of the brake drum 12, as clearly seen in Figures 5 and 6, thereby rendering the valve stem coupling inaccessible for practical purposes from the rear, when the wheel is mounted on the hub 11 and the hub cap 21 is locked in place.

It will be seen from the foregoing that with the improved wheel and valve stem construction and arrangement, theft of the wheel as well as the tire used in supporting a vehicle is effectively prevented.

The valve stem may be arranged so that when it projects through the hub 7, it exerts pressure upon the hub so as to overcome any tendency to rattle therein. If desired, however, a grommet may be located in the openings 17 so as to receive the stem extensions and in that way prevent rattling.

It is to be appreciated that the improved wheel and valve stem assembly enables the same to be effectively locked on a spare wheel carrier or other support cooperating with the tire to substantially prevent access to the rear of the wheel.

It is to be noted from the foregoing that the invention affords an extremely simple construction embodying a minimum of parts which are however durable and effective for theft prevention.

Figure 7 shows how an automobile body 41 at the spare wheel carrier 42 supporting a wheel and valve stem assembly embodying the invention may cooperate therewith in preventing tampering with the valve stem. While in this figure the form of wheel structure of Figures 1, 2 and 3 is illustrated, it will be understood that the body would likewise cooperate with the form of wheel shown in Figures 4, 5, and 6.

The disc and spoke wheels are preferably of metal such as steel or other alloy providing requisite strength.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a wheel assembly, a wheel having a rim provided with an opening located so that a tire valve stem extends therethrough in a generally radial direction when a tire is properly mounted on the wheel, said wheel extending inwardly in front of said opening from said rim so as to shield the outer part of the stem and having a central rearwardly extending peripheral wall provided with an opening through which also the valve stem extends, a flange integrally united with and extending inwardly from said wall behind the second opening and formed to receive fastening means for fastening the wheel to a wheel support, and a cap cooperating with the wheel in shielding the inner end of the stem and the fastening means in the enclosure formed by said wall, said cap being movable to a position rendering the inner end of the stem and the fastening means accessible.

2. In a wheel assembly, a wheel having a rim provided with an opening located so that a tire valve stem extends therethrough in a generally radial direction when a tire is properly mounted on the wheel, said wheel extending inwardly in front of said opening from said rim so as to shield the outer part of the stem and having a central rearwardly extending peripheral wall provided with an opening through which also the valve stem extends, a flange integrally united with and extending inwardly from said wall behind the second opening and formed to receive fastening means for fastening the wheel to a wheel support, and a cap cooperating with the wheel in shielding the inner end of the stem and the fastening means in the enclosure formed by said wall, said cap being movable to a position rendering the inner end of the stem and the fastening means accessible.

3. In a wheel including a tire rim, a depressed central nave part having a central inner wheel mounting flange, and a disk-like cover cooperable with said nave part to conceal said flange, a valve stem connection extending from said rim into the interior of said nave part having an end terminating adjacent said mounting flange so as to be accessible upon removal of said cover.

4. In a wheel including a tire rim, a nave part having a central opening and a central wheel mounting flange accessible through said opening, and a disk-like cover cooperable with said nave part to conceal said flange, a valve stem connection extending from said rim into the interior of said nave part opening having an end terminating adjacent said mounting flange so as to be accessible upon removal of said cover.

ARTHUR P. FERGUESON.